No. 771,156.

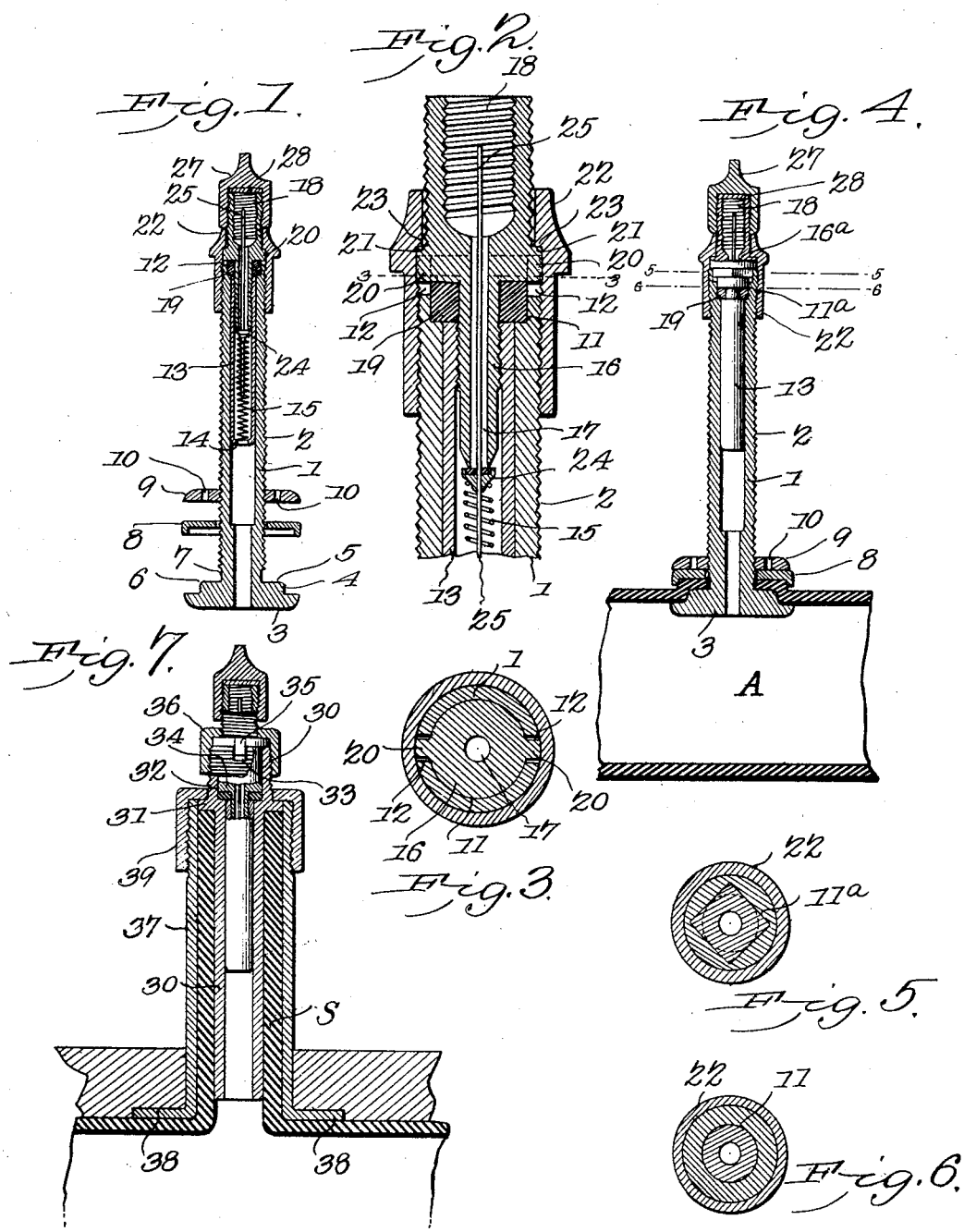

Patented September 27, 1904.

UNITED STATES PATENT OFFICE.

JOHN ESTEN KELLER, JR., OF LITCHFIELD, CONNECTICUT.

VALVE FOR PNEUMATIC TIRES.

SPECIFICATION forming part of Letters Patent No. 771,156, dated September 27, 1904.

Application filed December 29, 1903. Serial No. 186,986. (No model.)

*To all whom it may concern:*

Be it known that I, JOHN ESTEN KELLER, Jr., a citizen of the United States, residing at Litchfield, in the county of Litchfield and State of Connecticut, have invented a new and useful Valve for Pneumatic Tires, of which the following is a specification.

This invention relates to valves for pneumatic tires, and has for its principal object the provision of a valve of such construction that the entire valve mechanism may be readily removed from the valve-tube attached to the tire without the use of tools and without injury to the packing disposed between the valve-casing and the tube in which the valve is secured.

A further object of the invention is to provide a valve of the character specified in which rotation of the valve-plug when the pump is attached thereto for inflating the tire is positively prevented, so obviating the twisting or tearing of the packing external to the valve-plug and prolonging the period during which the valve will operate without repair.

As the construction of a valve for a pneumatic tire necessarily includes a number of elements of comparatively fragile nature, all such valves occasionally become inoperative or defective in operation so that repair is necessary. When the operation of such a valve becomes defective, it must be immediately repaired, in order to keep the tire to which it is attached inflated to the proper degree. The repair of tire-valves is apt to be more or less tedious, partly because the parts of the valve are ordinarily so connected that it is difficult to obtain access to the interior of the valve and partly because it is not always easy after the defect has been discovered to correct it satisfactorily. The difficulty of obtaining access to the inner structure of the valve is, however, the most serious cause of delay in making repairs to tire-valves, and in order to avoid the necessity of stopping for a considerable period at the roadside in order to repair a defective valve of a vehicle-tire I have provided a valve and securing means therefor of such structure that the entire valve mechanism may be quickly and easily removed from the valve-tube and a new valve introduced in its stead. The defective valve may then be repaired at leisure, and by carrying a small supply of duplicate valves the owners of vehicles provided with pneumatic tires will be enabled to avoid the necessity of stopping for more than a few moments in case one of the tire-valves becomes defective in operation.

The preferred forms of mechanism by which I attain the objects above mentioned and others which will appear as the invention is more fully disclosed are hereinafter fully described and illustrated in several different forms of embodiment in the accompanying drawings, it being understood that changes in the form, proportions, and mode of assemblage of the elements exhibited may be made within the scope of the appended claims without departing from the spirit of the invention or sacrificing the advantages thereof.

In the drawings, Figure 1 is a longitudinal section through the preferred form of valve. Fig. 2 is an enlarged longitudinal sectional view of the upper portion of the valve-tube, the valve-plug, and members associated therewith. Fig. 3 is a transverse section on the line 3 3 of Fig. 2. Fig. 4 is a view, partly in longitudinal section and partly in elevation, of a modified form of valve. Fig. 5 is a transverse section on the line 5 5 of Fig. 4. Fig. 6 is a transverse section on the line 6 6 of Fig. 4. Fig. 7 is a view, partly in elevation and partly in section, of another modified form of valve.

In disclosing the nature of the invention I shall describe valves adapted for use upon tires of the type in which the valve is secured in a metal tube clamped upon the inner or air tube of the tire and valves adapted for use in connection with tires having a tubular stem formed integral with the tire-tube itself.

In the drawings corresponding parts are designated by similar character of reference in the several views.

Referring to the drawings, and more particularly to Fig. 1 thereof, 1 designates a metal tube externally threaded, as shown at 2, and provided at one end with a flange 3, designed for introduction within the inner or air tube A of a tire. The flange 3 is preferably provided upon its upper or outer surface with a circumferential rabbet 4 surrounding a central raised portion 5 of the flange, which presents at its periphery a rounded shoulder 6. Immediately above the flange 3 and between it and the threaded outer surface 2 the tube is reduced slightly in external diameter, as shown at 7, to provide a circumferential groove for the reception of the thickened portion of the tube A surrounding the opening through which the tube 1 extends. When the flange is formed as described, a washer 8, having a central opening sufficiently large to permit it to pass freely over the threaded exterior of the tube 1, is provided upon the tube, and this washer has at the periphery thereof an annular rib on the under surface which coöperates with the rabbet formed upon the flange 3 to grip the material of the tube A. In order to force the washer 8 into clamping engagement with the tube A, a nut 9, provided with openings 10 for the reception of spanner-lugs, is threaded upon the exterior of the tube 1. At the upper or outer end the tube 1 is counterbored, as shown at 11, to afford a seat for the packing-washer on the exterior of the valve mechanism, and at diametrically opposite points square notches 12 are cut in the end of the tube 1 for engagement with lugs formed upon the valve-plug, as shown in Fig. 3.

The valve mechanism preferably used with the tube and securing devices above described comprises a tubular casing 13, which is constricted at the lower end, as shown at 14, to afford support for a spiral spring 15, which is loosely held within the casing. At its upper end the casing is internally threaded for engagement with the externally-threaded lower portion of a valve-plug 16, which consists of a lower portion of relatively small diameter and an upper portion of relatively large diameter. The valve-plug is centrally bored to form an air-passage 17 and in the upper end is counterbored, as shown at 18, to provide for the connection of a pump therewith, the wall of the counterbored portion being threaded for that purpose. Between the upper end of the valve-casing 13 and the relatively large upper portion of the valve-plug a washer 19, of rubber or other suitable packing material, is provided. The washer is of such diameter that it will enter easily into the counterbore 11 of the tube 1 and is of such thickness that when clamped tightly between the valve-plug and the bottom of the said counterbore the washer will expand into contact with the side wall of the counterbore. The portion of the valve-plug immediately above the washer 19 is of such diameter that that it also will enter into the counterbore 11 of the tube 1, and at diametrically opposite points upon that portion of the valve-plug lugs 20 are provided for engagement with the notches 12, formed in the end of the tube 1.

Just above the lugs 20 the valve-plug is provided with a flange 21, which extends over the top of the tube 1, but has a diameter slightly smaller than the external diameter of the tube 1. The flange 21 is provided for engagement with a retention cap or collar 22, which is screwed upon the exterior of the tube 1 and which has at the top an inwardly-disposed flange 23, which is adapted for contact with the upper surface of the flange 21. When the retention cap or collar 22 is screwed down upon the end of the tube 1, the valve-plug is forced down into the counterbore of said tube to sufficient extent to compress the packing-washer in the counterbore and cause the lugs 20 to engage with the notches 12, provided for that purpose. A conical valve member 24 is supported within the valve-casing by the spiral spring 15 and is held normally in contact with the lower end of the valve-plug by the said spring. The valve member 24 is provided on its upper surface with rubber packing, as usual, and a valve-stem 25, fixed upon the upper surface of the member 24, extends upward through the channel in the valve-plug to afford means for depressing the member 24 if stuck to the lower end of the valve-plug. Upon the top of the valve-plug a dust-cap 27 of any ordinary or preferred construction is secured, the dust-cap being provided, as usual, with a disk 28, of packing material, for contact with the upper end of the valve-plug.

In Fig. 4 a slightly-modified form of valve construction is illustrated. In this modified form of valve the means employed for securing the tube 1 upon the air-tube A is precisely like that already described, and the retention-cap used to hold the valve mechanism in the tube 1 is also similar to the retention-cap above described. The principal difference in construction is presented in the counterbore at the top of the tube 1 and in the valve-plug which coöperates therewith. In this modification of the valve structure the tube 1 is provided with a counterbore 11$^a$, the lower portion of which is circular in cross-section, as shown in Fig. 6, and the upper portion is square in cross-section, as shown in Fig. 5. The valve-plug 16$^a$ is similar in all respects to the valve-plug 16, except that the portion which enters the counterbored chamber in the end of the tube 1 is square in cross-section, as shown in Fig. 4, to correspond to the contour of the upper portion of said counterbored chamber. The packing-washer employed between the valve-plug and the valve-casing is similar to that already described and fits within the round portion of the counterbored chamber.

In Fig. 7 a valve of the type for use in connection with tires having a tubular stem formed integral therewith is illustrated. In this modified form of the valve the externally-threaded tube 1 is replaced by a tube 30 of smooth exterior, provided at the top with a flange 31, extending over the end of the tubular stem S of a tire. The tube 30 is provided at the top with a counterbore 32 for the reception of the valve mechanism, which may be of either of the forms above described. In the form of the valve illustrated in Fig. 7 the tube 30 is provided at the top with notches 33 and the valve-plug 34 is provided with lugs 35 for engagement with said notches; but the counterbore may be of the type illustrated in Figs. 4, 5, and 6, if preferred. The top of the tube 30 is externally threaded, as shown, and the valve mechanism is secured in the counterbore of said tube by means of a retention-cap 36, similar to the retention-caps already described. The inner structure of the valve is identical with that illustrated in Fig. 1 and needs no detailed description.

Any preferred devices may be employed to hold the tube 30 in position within the tire-stem S, but the preferred form of securing means is that described and illustrated in my copending application, Serial No. 172,397, which consists of a collar 37, provided at the bottom with extensions 38, which are bent outward at their lower ends to engage with the outer surface of the rim R of the wheel, and a retention-cap 39 threaded upon the exterior of said collar and provided with an inwardly-disposed flange for engagement with the upper surface of the flange 31 of the tube 30.

In the several forms of the valve above described the valve mechanism may be removed as an entirety from the tube in which it is secured by merely unscrewing the retention-cap provided upon the upper end of said tube. The valve-plug being in threaded engagement with the valve-casing in every instance, the removal of the valve-plug from the counterbore in the upper or outer end of the tube in which the valve is held causes the withdrawal at the same time of the valve-casing and the elements contained therein. The packing-washer disposed between the lower surface of the valve-plug and the bottom of the counterbore in which the valve-plug is seated is in each case firmly secured between the upper end of the valve-casing and the enlarged upper portion of the valve-plug, so that the withdrawal of the valve-plug and valve-casing will remove the packing-washer from the counterbore of the tube and prevent its loss, which is of frequent occurrence in valves of the ordinary type.

In all the forms of valve above described some means is provided to prevent rotation of the valve-plug within the tube which holds the valve mechanism. The prevention of rotation of the valve-plug in the tube is of importance because such rotation tends to twist and tear the packing-washer in the counterbore of the tube, and so to render said packing-washer ineffective. If no means be provided to prevent such rotation by positive interlocking of the valve-plug with the tube, the attachment of a pump to the valve for the inflation of the tire or the detachment of the pump from the valve will cause a certain amount of rotative movement of the valve-plug in the tube and wear upon the packing-washer will inevitably result. By providing interlocking members upon the valve-plug and the tube in which the valve mechanism is held the rotation of the valve-plug is of course absolutely prevented, and the life of the packing-washer between the valve-plug and the bottom of the counterbore in the tube is indefinitely prolonged.

From the foregoing description and the accompanying drawings it will be clearly seen that the valve disclosed is of such character that it has very little liability to derangement; but if the operation of the valve becomes in the slightest degree defective the entire valve mechanism may be instantly removed from the tube attached to the tire and new valve mechanism introduced in lieu of the defective one removed. It will also be obvious that the prevention of any rotation of the valve-plug in the tube attached to the tire will lessen the liability of the valve to become leaky and will minimize the frequency of repairs.

Having thus described the construction and operation of my invention, what I claim as new, and desire to secure by Letters Patent, is—

1. In a structure of the character specified, a valve-tube, a valve mechanism including a tubular valve-casing and a valve-plug secured in the outer end of said casing, a packing-washer disposed between the end of said casing and the upper portion of the plug, and means for securing said valve mechanism in said valve-tube with the packing-washer in contact with the bore of said valve-tube.

2. In a structure of the character specified, a valve-tube having a counterbore at the upper end and having a threaded exterior, a valve mechanism having a packing-washer positively secured on the exterior thereof and adapted to fit in said counterbore, said valve mechanism also having an outwardly-projecting flange overlying said packing-washer, and a retention-cap adapted for threaded engagement with the exterior of said valve-tube, said retention-cap having an inwardly-disposed flange adapted for engagement with the flange upon the valve mechanism.

3. In a structure of the character specified, a valve-tube having a counterbore at the upper end, a valve mechanism including a tubular valve-casing and a plug screwed into the outer end of said valve-casing, said plug having an enlarged upper portion, a packing-washer positively secured between the end of said valve-casing and the enlargement of said valve-plug, and means for securing said valve mechanism in said valve-tube and compressing the packing-washer against the bottom of said counterbore.

4. In a structure of the character specified, a valve-tube having a counterbore at the upper end, a tubular valve-casing, a valve-plug threaded in the upper end of said valve-casing, a packing-washer clamped between the upper end of said valve-casing and said valve-plug, said packing-washer being adapted to fit within said counterbore, coacting devices upon said valve-plug and said valve-tube to positively prevent rotation of said valve-plug within said valve-tube, and means for locking said coacting devices in engagement and simultaneously compressing said packing-washer against the bottom of said counterbore.

In testimony that I claim the foregoing as my own I have hereto affixed my signature in the presence of two witnesses.

JOHN ESTEN KELLER, Jr.

Witnesses:
K. L. BUEL,
J. L. MOWER.